United States Patent
Vesterdal et al.

(10) Patent No.: US 9,302,859 B2
(45) Date of Patent: Apr. 5, 2016

(54) VEHICLE LOADING AND UNLOADING DETECTION

(75) Inventors: Steven H. Vesterdal, Tucson, AZ (US); Jonathan P. Olson, Tucson, AZ (US)

(73) Assignee: LEICA GEOSYSTEMS MINING, INC., Tucson, AZ (US)

( * ) Notice: Subject to any disclaimer, the term of this patent is extended or adjusted under 35 U.S.C. 154(b) by 1182 days.

(21) Appl. No.: 12/897,575

(22) Filed: Oct. 4, 2010

(65) Prior Publication Data

US 2012/0084047 A1   Apr. 5, 2012

(51) Int. Cl.
*G01P 15/00* (2006.01)
*B65G 67/00* (2006.01)

(52) U.S. Cl.
CPC ..................... *B65G 67/00* (2013.01)

(58) Field of Classification Search
CPC ....................................................... G01P 15/00
USPC ............. 702/141, 33, 36, 150, 176, 173, 174, 702/178, 187, 188
See application file for complete search history.

(56) References Cited

U.S. PATENT DOCUMENTS

| | | | | |
|---|---|---|---|---|
| 5,327,347 A | * | 7/1994 | Hagenbuch | 701/50 |
| 5,579,013 A | * | 11/1996 | Hershey et al. | 342/357.4 |
| 5,970,436 A | * | 10/1999 | Berg et al. | 702/177 |
| 5,995,888 A | * | 11/1999 | Hagenbuch | 701/32.3 |
| 6,646,210 B1 | * | 11/2003 | Wissing | G01G 19/08 177/136 |
| 6,728,619 B2 | * | 4/2004 | Sugiyama et al. | 701/50 |
| 7,395,184 B2 | * | 7/2008 | Takeda | 702/174 |
| 7,451,642 B2 | * | 11/2008 | Hara et al. | 73/146 |
| 7,832,126 B2 | * | 11/2010 | Koellner et al. | 37/348 |
| 7,894,961 B2 | * | 2/2011 | Blackburn et al. | 701/50 |

FOREIGN PATENT DOCUMENTS

WO   WO 2009008784 A1 * 1/2009 ............... B60P 1/58

OTHER PUBLICATIONS

Miller, R. E. et al., "A GPS Based System for Minimizing Jolts to Heavy Equipment Operators", SAE Commercial Vehicle Engineering Congress and Exhibition, Oct. 28-28, 2004, Chicago, IL, Warrendale, PA: Society of Automotive Engineers International, p. 1-4.
International Search Report mailed Jun. 30, 2011 as received in related PCT Application No. PCT/US2011/039462.

* cited by examiner

*Primary Examiner* — Sujoy Kundu
*Assistant Examiner* — Ricky Ngon
(74) *Attorney, Agent, or Firm* — Maschoff Brennan

(57) ABSTRACT

A system for determining vehicle loading and unloading comprises an acceleration detector provided on a vehicle, a location detector for detecting the location of the vehicle and a processor that receives information detected by the acceleration detector and location detector and determines whether the detected acceleration is due to vehicle loading, unloading or travel, based on the received information. A timer may be started, when vehicle loading or unloading is determined, such that the amount of time spent loading or unloading the vehicle may be obtained. Also, a condition of a traveled surface may be determined based on information received from the acceleration detector and location detector.

23 Claims, 1 Drawing Sheet

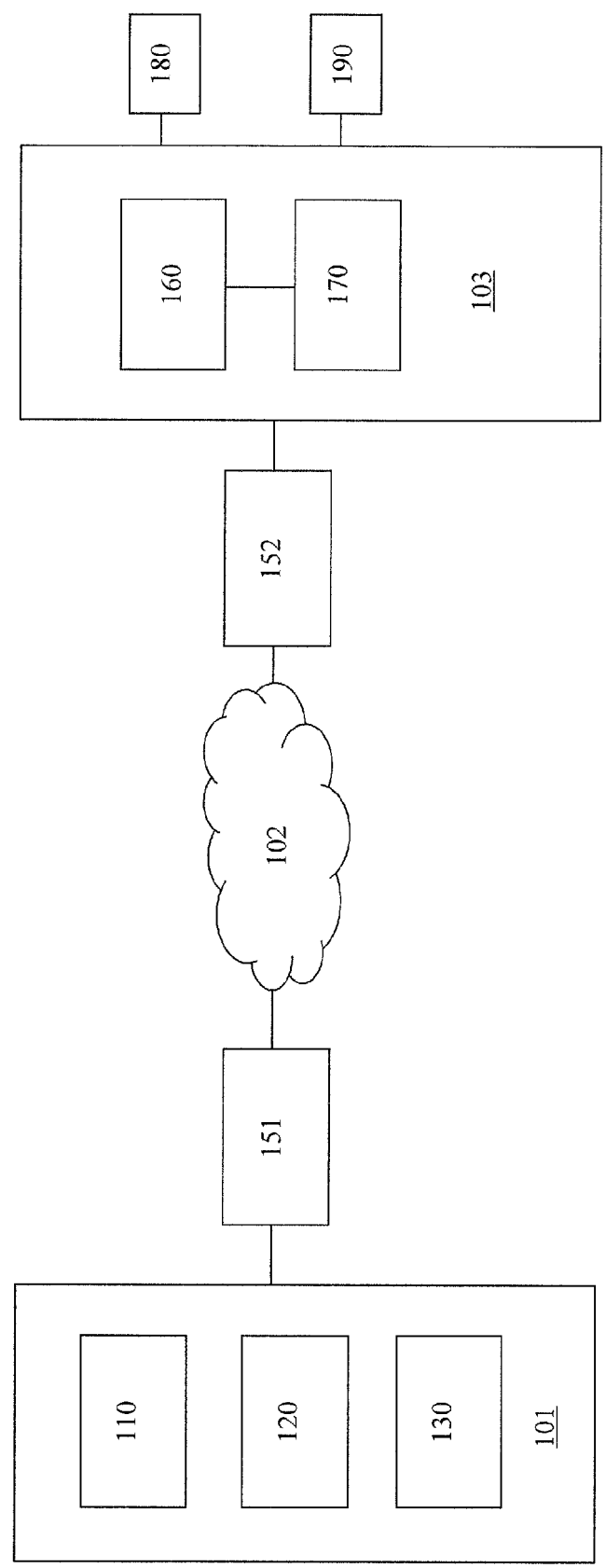

VEHICLE LOADING AND UNLOADING DETECTION

FIELD OF THE INVENTION

The present invention relates to a system and method for determining vehicle loading and unloading. The invention has particular utility in connection with mining operations where a measurement of the amount of time spent performing certain processes, such as loading and unloading a vehicle, is an important piece of information that may be used to increase productivity and efficiency of the mining operation. The invention will be described in connection with such utility, although other utilities are contemplated.

BACKGROUND OF THE INVENTION

Many current operations rely upon loading a material or product into a vehicle or other equipment. Automation of many of the processes in the operation is a commonly-sought objective to increase productivity and efficiency. For example, many mining operations utilize vehicles to load, haul and unload materials. Increasing the productivity and efficiency of the processes within a mining operation is particularly desirable as each load hauled by a mining vehicle may be very valuable. Moreover, capital equipment costs in large mining operations can be quite high.

In current mining operations, one of the more difficult portions of the mining cycle to reliably detect is the start of a loading or unloading process. Without knowledge of the time in which the loading or unloading process actually started it is very difficult, if not impossible, to accurately determine how long the process takes to complete, or to monitor and evaluate drivers and loaders, determine when a driver is becoming fatigued or slowing down on the job, so that the driver can be relieved or replaced, etc. It is desirable to know how long each process takes to complete in order to monitor the productivity and efficiency of the operation. In large mining operations, the old adage "time is money" indeed holds true.

Some current mining systems rely on a vehicle operator manually indicating that a loading process has begun. For instance, the vehicle operator may be required to push a button in order to indicate that the loading process has started. Such a technique, however, depends on the accuracy and memory of the operator. If the operator forgets to push the button, or pushes the button too early or too late, any measurement of when the loading process began and how long it took to complete will be inaccurate and unreliable.

Other current mining systems rely only on the location of the vehicle, using GPS for example, to try to infer that the mining vehicle is engaged in the process of loading or dumping a payload. One problem with such a method is that often multiple trucks will be present at a loading site at the same time. GPS alone cannot provide the data necessary to determine when a particular truck begins the loading process. Moreover, many trucks may sometimes stop near a loading site at shift change, thus frustrating any attempt to determine when a loading process for a particular truck began.

Thus, there is a need in the field for a system for detecting the location of a vehicle, such as a mining vehicle, and determine whether the vehicle is undergoing loading or unloading, travelling or sitting idle.

There is also a need in the field for a system that can reliably begin a timer when a vehicle begins a loading or unloading process, so that the time that a vehicle spends completing a particular activity may be known and used to monitor and increase productivity.

Furthermore, there is a need in the field for a system that can determine a condition of a road based on acceleration experienced by a vehicle as it travels over the road.

The ability to reliably and accurately determine whether a vehicle is beginning a loading or unloading process, starting a timer so that the amount of time spent performing the loading or unloading may be recorded, and determining a condition of the road allows for increased operation efficiency and production in a mining operation.

SUMMARY OF THE INVENTION

The current invention is directed to a system and method for detecting loading, unloading and/or travel of a vehicle. More particularly, the present disclosure utilizes data detected by an acceleration detector and a location detector to determine whether the detected acceleration is due to vehicle loading, unloading or travel.

In one aspect, the disclosure provides a system for detecting loading, unloading or travel of a vehicle that includes an acceleration detector provided on the vehicle, a location detector for detecting the vehicle's location, and a processor that receives information detected by the acceleration detector and the location detector and determines whether the detected acceleration is due to vehicle loading, unloading or travel, based on the received information.

In another aspect, the disclosure provides a method for detecting loading, unloading or travel of a vehicle by detecting acceleration, detecting the location of the vehicle, transmitting information detected by the acceleration detector and the location detector to a processor, and determining, by the processor, whether the detected acceleration is due to vehicle loading, unloading or travel, based on the received information.

The accelerometer may be an accelerometer, and may further be a triaxial accelerometer.

The processor may be configured to determine whether the vehicle is at a loading or unloading site, based on information received from the location detector.

Furthermore, the processor may be configured to start a timer when vehicle loading or unloading is determined. The processor also may be configured to determine when vehicle loading or unloading is complete, and may stop the timer when loading or unloading is determined to be complete.

The processor may be configured determine when vehicle loading is complete by counting the number of shovel loads.

In a further aspect, the processor may be configured to determine whether the vehicle dump body is raised, based the information received from the acceleration detector. Additionally, the processor may be configured to determine whether the vehicle dump body is raised based on information detected by a dump body motion detector.

A speed sensor may further be provided on the vehicle, and the processor may further receive information from the speed sensor and determine whether the detected acceleration is due to vehicle loading, unloading or travel, based on the information received from the acceleration detector, the location detector and the speed sensor.

The processor also may be configured to determine a condition of a traveled surface, based on the information received.

In a further aspect, computer-readable memory may be provided which is configured to store information relating to the condition of the traveled surface.

The processor may be located in a central computer remote from the vehicle and the processor receives said information through a wireless communications network, or the processor may be located onboard the vehicle.

Accordingly, some of the advantages of the present disclosure are to provide a more reliable and accurate determination of whether a vehicle is beginning a loading or unloading process, to start a timer so that the amount of time spent performing the loading or unloading may be recorded, and to determine and record a condition of a traveled road. Still further objects and advantages will become apparent from the detailed description and accompanying drawings.

The features, functions and advantages that have been discussed can be achieved independently in various embodiments of the present disclosure or may be combined in yet other embodiments, further details of which can be seen with reference to the following descriptions and drawings.

BRIEF DESCRIPTION OF THE DRAWINGS

Further features and advantages of the invention will be seen from the following detailed description, taken in conjunction with the accompanying drawings, wherein like numerals depict like parts, and wherein:

FIG. 1 schematically illustrates a system for determining vehicle loading and unloading in accordance with an embodiment of the present disclosure.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many embodiments of the invention may take the form of computer-executable instructions, including algorithms executed by a programmable computer. The invention also can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers) and the like.

The invention also can be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable memory and media, including magnetic and optically readable and removable computer disks and portable computer-readable memory devices, as well as distributed electronically over networks. The computer-readable memory also may be random access memory ("RAM"), read-only memory ("ROM"), programmable FlashROM, or any other computer-readable memory structure known in the relevant art. Data structures and transmissions of data particular to aspects of the invention also are encompassed within the scope of the invention.

FIG. 1 schematically illustrates a primary example of a vehicle loading and dumping detection system provided by this disclosure. A mining vehicle 101 operating in a mining site is provided with an acceleration detector, which may be an accelerometer 110. The mining vehicle 101 may be, for example, a haul truck.

The accelerometer 110 may be a triaxial accelerometer that is capable of measuring acceleration in all three spatial dimensions. Accelerometers are used in many currently-available devices, including a number of cellular phones, to enable the performance of various tasks such as rotating the display's orientation automatically as a user changes from a portrait to a landscape position, playing games, and various other controls. Often, the accelerometers are Micro-electro-mechanical sensor ("MEMS") devices. Such widely-available, inexpensive and reliable accelerometers may be employed in the present invention.

In operation, the accelerometer 110 detects vertical and horizontal shock to the vehicle 101 on which it is mounted. For example, when the vehicle 101 is at a loading site, each shovel load moved by a dipper into the vehicle body may be detected by the accelerometer 110 as vertical shock. An indication of acceleration in the vertical direction will be present at the output of the accelerometer 110. Similarly, when the vehicle 101 is unloading a payload, the shock created by the dumping will be detected by the accelerometer 110. The vertical acceleration produced when the vehicle 101 raises the dump body also may be detected by the accelerometer 110. Additionally, the accelerometer 110 may detect vertical and horizontal accelerations produced as the vehicle 101 travels over upward or downward sloping surfaces, as well as rough surfaces.

The accelerometer 110 may be mounted anywhere on or in the vehicle 101 such that the shock of loading and/or unloading the vehicle 101 may be detected. For example, in a mining haul truck, the accelerometer 110 may be located on the chassis or under the dumping body. Alternatively, the accelerometer 110 may be positioned in the vehicle cab, as the shock caused by loading and/or unloading the vehicle may cause sufficient acceleration on the vehicle to be detected in the vehicle cab.

A location detector 120 may further be provided onboard the vehicle 101. The location detector 120 may detect vehicle location by various techniques known in the art, including Global Positioning System (GPS) and inertial navigation systems. The vehicle speed may also be detected by a speed sensor 130 such as a speedometer located onboard the vehicle.

In one aspect provided by the present disclosure, the information detected by the accelerometer 110, the location detector 120 and/or the speed sensor 130 may be transmitted through a wireless network 102 to a central computer 103 in order to consolidate and process the information and to determine a state of the vehicle operation, such as loading, unloading or traveling.

Wireless communication devices 151, 152 enable communication between the central computer 103 and the vehicle 101. The wireless communication devices 151, 152 may be located with or within the central computer 103, with or within the vehicle 101, and/or at other points local to a site. The wireless network 102 may be any type of wireless computer network that enables communication between devices, for example Wireless LAN, Wi-Fi, mobile device networks, and/or 3 G communications protocols.

The central computer 103 includes computer-readable memory 160, and a processor 170. The central computer 103 communicates with wireless communication device 150, thereby enabling communications between the central computer 103 and other devices through wireless network 102. A display 180 and I/O devices 190 may be connected to the central computer 103, thereby allowing a user and/or peripherals to communicate with the central computer 103. The central computer 103 may be a central server, which may be accessible to other computer terminals through a wired or wireless network.

The processor 170 may execute an algorithm to determine, based on the information received from the accelerometer 110, the location detector 120 and/or the speed sensor 130, a state of vehicle operation such as loading, unloading or traveling. For example, the processor 170 may determine, based on the location information, that the vehicle is approaching a known loading site. Information from the speed sensor may indicate that the vehicle is stationary. Thus, when information is received from the accelerometer indicating that the vehicle has experienced a vertical shock, the processor 170 may determine that the loading process has begun.

Moreover, as soon as the information is received from the accelerometer 110 indicating vertical shock, the processor 170 may cause a timer to start. This may be accomplished, for example, by sending a start signal from the processor to an electronic timer, computer clock, or the like. The timer may run until the processor has determined that the loading process has completed, at which point the timer may be stopped by the processor. The processor may determine that the loading process has completed, for example, based on information received from the speed sensor 130 that indicates the vehicle 101 has begun traveling. Alternatively, the timer may be stopped upon receipt of information from the location detector 120 indicating that the vehicle 101 has moved, or has left the loading site area. The loading site area may a predefined area.

In another aspect, the processor 170 may count the number of shovel loads moved into the vehicle body. Each shovel load moved into the vehicle body will create a shock detected by the accelerometer 110. Thus, the processor may be configured to initiate a count, beginning with the first detected shovel load. The processor may start a timer when it receives information from the accelerometer 110 indicating the receipt of the first shovel load. The timer may run until a predetermined number of shovel loads has been counted by the processor 170. The predetermined number of shovel loads may be a known number of shovel loads that constitute a full vehicle load. Upon counting the predetermined number of shovel loads, each indicated by information received from the accelerometer 110, the processor 170 may stop the timer. Thus, the amount of time spent loading the vehicle 101 may be determined.

In a similar manner, the processor 170 may determine that the vehicle 101 has begun an unloading process. That is, the processor 170 may determine based on information received from the location detector 120 that the vehicle 101 is approaching, or is located at, an unloading site. Information from the speed sensor 130 may also be utilized to determine that the vehicle 101 is stationary. When the processor 170 receives information from the accelerometer 110 indicating that the vehicle has experienced a shock, the processor 170 may determine that the unloading process has begun. A timer may be started, and the amount of time spent unloading the vehicle 101 may be determined as described above in reference to a loading process.

Furthermore, the processor 170 may determine that the dump body is in a raised position, or in the process of being raised, based on the information received from the accelerometer 110. In a further aspect, the processor 170 may receive information from a dump body motion sensor that indicates the dump body is raised. The dump body motion sensor may be, for example, a micro-switch, or any number of known motion detectors such as magnetic based detectors or ultrasonic detectors. This information may be used to initiate the timer.

In a further aspect provided by this disclosure, the processor 170 may determine the condition of a traveled surface, such as a mining road, based on information received from the accelerometer 110. For example, as the vehicle 101 travels over a road, the accelerometer 110 may detect shocks due to the roughness of the road. The magnitude of the shocks detected by the accelerometer 110, as well as the frequency of their occurrence, may be utilized by the processor 170 to determine a condition of the road. The processor 170 may further utilize information received from the location detector 120 to record the location of the road corresponding with the information received from the accelerometer 110. The condition of the road, including the locations of rough or uneven surfaces, may thus be recorded. The information regarding the condition of the road may be stored in computer-readable memory 160.

The processor 170 may further determine the grade or slope of the road being traveled based on information received from the accelerometer 110 and the location detector 120. Information regarding the grade or slope of the road is also useful for determining the efficiency of the driver, e.g., if the truck slows down unnecessarily.

Aspects of a mining operation may be adjusted based on the loading time, unloading time and the condition of the road, in order to optimize mine production. For example, the central computer 103 may issue a command to the vehicle operator to subsequently increase the vehicle speed if the loading process took longer than anticipated. The central computer 103 also may issue commands to operators of other vehicles within a mining operation to decrease their speed, thereby preventing a logjam at the loading site. Moreover, if the road condition is determined to be uneven or otherwise unsuitable for certain rates of speed, the central computer 103 may issue a warning to slow the vehicle speed.

In another aspect provided by the present disclosure, the vehicle 101 is provided with an onboard computer, which includes a processor and computer-readable memory. In such a configuration, the processor in the onboard computer may receive information from the accelerometer 110, location detector 120 and/or speed sensor 130. The processor may then execute algorithms, as described above, for determining that the vehicle has begun a loading or unloading process, initiating a timer to record the amount of time spend loading or unloading, and determining the condition and/or grade of the road. The processor may then transmit the results of these algorithms to the central computer 103 over the wireless network 102.

Various changes may be made in the invention without departing from the spirit and the scope thereof. It should be emphasized that the above-described embodiments of the present vehicle loading and unloading detection system are merely possible examples of implementations and are merely set forth for a clear understanding of the principles of the invention. Many different embodiments of the vehicle loading and unloading detection system described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

What is claimed is:

1. A system for detecting the start and completion of loading and unloading of a vehicle, comprising:
   an acceleration detector provided on the vehicle, the acceleration detector configured to detect a vertical acceleration of the vehicle;
   a location detector configured to detect the vehicle's location;
   a processor which receives information detected by the acceleration detector and the location detector and determines that the vehicle is loading when acceleration information indicating that the vehicle has experienced the vertical acceleration is received after location information indicating that the vehicle is approaching a loading site is received from the location detector; and
   a timer, wherein:
      the processor is configured to start the timer when the loading is determined to start in response to the processor receiving all of: acceleration information indicating that the vehicle has experienced the vertical acceleration and the location information indicating that the vehicle is approaching a loading site is received from the location detector;
      the processor is configured to stop the timer when the loading has completed; and
      the processor is configured to record the time taken to load the vehicle from the start to the completion measured by the timer.

2. The system of claim 1, wherein the vehicle is a mining vehicle.

3. The system of claim 1, wherein the acceleration detector is an accelerometer.

4. The system of claim 3, wherein the accelerometer is a triaxial accelerometer.

5. The system of claim 1, wherein the processor is configured to determine whether the vehicle is at a loading or unloading site, based on information received from the location detector.

6. The system of claim 1, wherein the processor is configured to count a number of shovel loads and determine when vehicle loading is complete when the counted number of shovel loads reaches a predetermined number.

7. The system of claim 1, wherein the processor is further configured to determine whether the vehicle dump body is raised, based on the information received from the acceleration detector.

8. The system of claim 1 further comprising a dump body motion detector, wherein the processor is further configured to receive information detected by the dump body motion detector and determine whether the vehicle dump body is raised, based on the information received.

9. The system of claim 1 further comprising a speed sensor provided on the vehicle, wherein the processor further receives information from the speed sensor and determines whether the detected acceleration is due to vehicle loading or unloading based on the information received from the acceleration detector, the location detector and the speed sensor.

10. The system of claim 1, wherein the processor is located in a central computer remote from the vehicle and the processor receives said information through a wireless communications network.

11. The system of claim 1, wherein the processor is located onboard the vehicle.

12. A mining vehicle comprising the system for detecting the start and completion of loading and unloading of the vehicle according to claim 1.

13. A method for detecting loading of a vehicle, comprising the steps of:
   detecting a vertical acceleration of the vehicle, with an acceleration detector provided on the vehicle;
   detecting the vehicle's location with a location detector;
   transmitting information detected by the acceleration detector and the location sensor to a processor;
   determining that the vehicle is loading when acceleration information indicating that the vehicle has experienced the vertical acceleration is received after location information indicating that the vehicle is approaching a loading site is received from the location detector;
   starting a timer when the loading is determined to start in response to the processor receiving all of: acceleration information indicating that the vehicle has experienced the vertical acceleration and the location information indicating that the vehicle is approaching a loading site is received from the location detector;
   stopping the timer when the loading has completed; and
   recording the time taken to load the vehicle from the start to the completion measured by the timer.

14. The method of claim 13, wherein the vehicle is a mining vehicle.

15. The method of claim 13, wherein the acceleration detector is an accelerometer.

16. The method of claim 15, wherein the accelerometer is a triaxial accelerometer.

17. The method of claim 13 further comprising the step of:
   determining, by the processor, whether the vehicle is at a loading site based on information received from a location detector.

18. The method of claim 13 further comprising the step of:
   starting a timer when vehicle loading or unloading is determined, wherein the timer is started by the processor.

19. The method of claim 18 further comprising the step of:
   stopping the timer when vehicle loading or unloading is complete, wherein the timer is stopped by the processor.

20. The method of claim 13 further comprising the step of:
   determining, by the processor, whether the vehicle dump body is raised.

21. A computer program product encoded in non-transitory computer readable medium, said computer program product being usable with a processor in a mining operation, for detecting the start and completion of unloading of a vehicle, wherein the vehicle is provided with an acceleration detector; the vehicle's position is detected by a location detector; and information detected by the acceleration detector and the location detector is transmitted to the processor; wherein said computer readable program code comprises a series of computer readable program steps for performing the method comprising:
   determining, by the processor, that the vehicle is unloading when an acceleration detected by the acceleration detector due to vehicle unloading is received after location information indicating that the vehicle is at an unloading site is received from the location detector, including determining, by the processor, whether the vehicle dump body is raised based on the acceleration detected by the acceleration detector;
   starting a timer when the unloading is determined to start in response to the processor receiving all of: acceleration information indicating that the vehicle is unloading and the location information indicating that the vehicle is at an unloading site is received from the location detector;

stopping the timer based on the acceleration detected by the acceleration detector when the completion of the unloading of the vehicle is determined, wherein the timer is stopped by the processor; and recording the time taken to unload the vehicle from the start to the completion.

22. The computer program product of claim 21, wherein said computer readable program code further comprises a computer readable program step of determining, by the processor, whether the vehicle is at an unloading site, based on information received from the location detector.

23. A mining vehicle comprising the computer program product encoded in non-transitory computer readable medium of claim 21.

* * * * *